(12) United States Patent
Krishnan et al.

(10) Patent No.: US 8,880,817 B2
(45) Date of Patent: Nov. 4, 2014

(54) STORAGE SUBSYSTEM BACKPLANE MANAGEMENT SYSTEM

(75) Inventors: Sarat Krishnan, Round Rock, TX (US); Armando Jaime Martinez, Austin, TX (US); Russell Allen Bauer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 12/970,620

(22) Filed: Dec. 16, 2010

(65) Prior Publication Data

US 2012/0159029 A1 Jun. 21, 2012

(51) Int. Cl.
*G06F 12/00* (2006.01)
*G06F 3/06* (2006.01)

(52) U.S. Cl.
CPC ............ *G06F 3/0658* (2013.01); *G06F 3/0626* (2013.01); *G06F 3/0689* (2013.01)
USPC .......................................... 711/156; 710/110

(58) Field of Classification Search
USPC ................................... 711/112, 156; 710/110
See application file for complete search history.

(56) References Cited

U.S. PATENT DOCUMENTS

| | | | |
|---|---|---|---|
| 6,378,084 B1 | 4/2002 | Strunk et al. | |
| 6,754,768 B2 * | 6/2004 | Dimitri et al. | 711/114 |
| 6,928,514 B2 | 8/2005 | Chatterjee et al. | |
| 7,571,274 B2 | 8/2009 | Clayton et al. | |
| 2006/0174085 A1 | 8/2006 | Wu et al. | |
| 2006/0206632 A1 | 9/2006 | Chiasson et al. | |
| 2006/0224844 A1* | 10/2006 | Kano et al. | 711/162 |
| 2008/0013411 A1* | 1/2008 | Thorp et al. | 369/30.01 |
| 2008/0126851 A1 | 5/2008 | Zadigian et al. | |
| 2010/0318718 A1* | 12/2010 | Eilert et al. | 711/103 |

OTHER PUBLICATIONS

Shawn Dube, Timothy M. Lambert and Surender Brahmaroutu; "Systems and Methods for Scalable Storage Management;" filed May 27, 2009; U.S. Appl. No. 12/473,180; 22 Pages.

* cited by examiner

*Primary Examiner* — Kalpit Parikh
(74) *Attorney, Agent, or Firm* — Haynes and Boone, LLP

(57) ABSTRACT

A storage subsystem backplane management system includes a storage controller and a service processor. A first backplane including a first management controller is coupled to the storage controller and the service processor. The first backplane is operable to couple a plurality of first drives to the first management controller. A second backplane including a second management controller is coupled to the first management controller. The second backplane is operable to couple a plurality of second drives to the second management controller. The first management controller communicates with the second management controller and creates a virtual management controller that presents to the storage controller and the service processor a virtual backplane including the plurality of first drives and the plurality of second drives when the plurality of first drives are coupled to the first management controller and the plurality of second drives are coupled to the second management controller.

17 Claims, 7 Drawing Sheets

STORAGE SUBSYSTEM BACKPLANE MANAGEMENT SYSTEM

BACKGROUND

The present disclosure relates generally to information handling systems (IHSs), and more particularly to the management of backplanes in an IHS storage subsystem.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, servers, include storage subsystems that have backplanes that may couple a plurality of storage devices to the IHS. Typically, a storage controller is coupled to the backplane to manage the storage devices. However, when more than one backplane is used in the storage subsystem such that there are multiple backplanes each coupling a plurality of storage devices to the IHS, a number of issues can arise. One conventional solution is to provide a separate storage controller for each backplane in the multiple backplane storage subsystem. Such solutions increase cost and present the IHS with the problem of communicating with multiple storage controllers. However, if the use of only a single storage controller is desired, the single storage controller may be coupled to a plurality of backplanes. This presents the single storage controller with multiple storage management domains, which results in problems with regard to which backplane the single storage controller should be communicating with, and raises a number of issues with regard to storage device enumeration schemes, contiguous storage device numbering, and/or a variety of other issues known in the art.

Accordingly, it would be desirable to provide an improved storage subsystem backplane management system

SUMMARY

A storage subsystem backplane management system includes a storage controller, a service processor, a first backplane including a first management controller that is coupled to the storage controller and the service processor, wherein the first backplane is operable to couple a plurality of first drives to the first management controller, and a second backplane including a second management controller that is coupled to the first management controller, wherein the second backplane is operable to couple a plurality of second drives to the second management controller, wherein the first management controller is operable to communicate with the second management controller and create a virtual management controller that presents to the storage controller and the service processor a virtual backplane including the plurality of first drives and the plurality of second drives when the plurality of first drives are coupled to the first management controller and the plurality of second drives are coupled to the second management controller.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
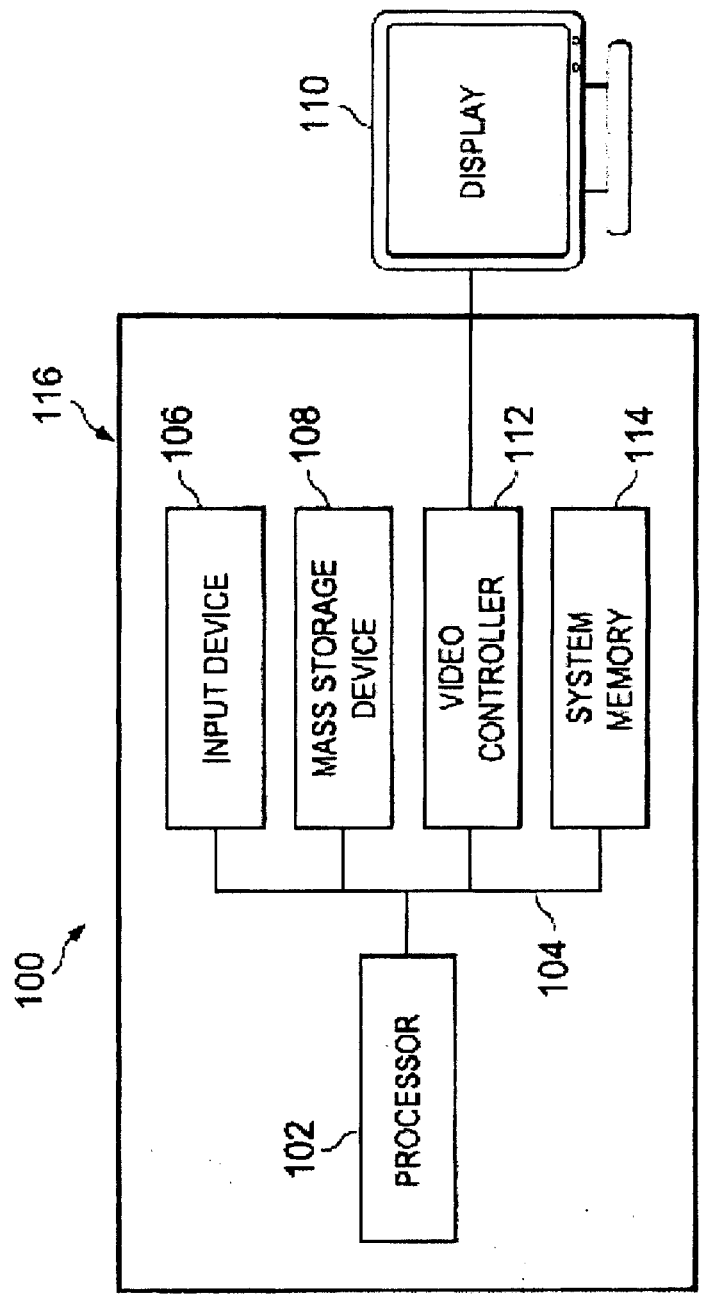
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2a, a schematic view of an embodiment of a storage subsystem backplane management system 200 is illustrated. The system 200 includes a storage controller 202. In an embodiment, the storage controller 202 may be a PowerEdge Expandable Redundant Array of Independent/Inexpensive Disks (RAID) Controller (PERC) storage controller, available from Dell, Inc. (www.dell.com), and/or a variety of other storage controllers known in the art. The system also includes a service processor 204. In an embodiment, the service processor 204 may be a Baseboard Management Controller (BMC), a physical server Environment Management Controller, a Dell Remote Access Controller (DRAC or iDRAC) available from Dell, Inc. (www.dell.com), combinations thereof, and/or a variety of other service processors known in the art that may provide, for example, environment and/or remote management functionality. A backplane 206 includes a Storage Enclosure Processor (SEP) 206a that is coupled to the storage controller 202 and the service processor 204. In an embodiment, the SEP 206a may be coupled to the storage controller 202 through one or more buses 208a that may be one or more Inter-Integrated Circuit (I²C) buses and/or one or more Serial Attached Small Computer System Interface (SAS) buses. In an embodiment, the SEP 206a may be coupled to the service processor 204 through one or more buses 208b that may be one or more I²C buses. The backplane 206 also includes a memory 206b coupled to the SEP 206a. In an embodiment, the memory 206b may be the memory 114 described above with reference to FIG. 1. In an embodiment, the memory 206b is a non-transitory, computer-readable medium that may include computer-readable instructions that are executable by a processor (e.g., the SEP 206a) to perform a number of functions (described in further detail below.)

The backplane 206 also includes a plurality of drive connectors 206c that are operable to couple a plurality of drives 206d to the SEP 206a. In an embodiment, the drives 206d may be mass storage devices (e.g., hard drives). However, a variety of other drives or IHS components known in the art may be used without departing from the scope of the present disclosure. In an embodiment, the backplane 206 may include an expander. In an embodiment, the expander is a Serial Attached Small Computer System Interface (SCSI) (SAS) expander. In an embodiment, the expander includes the SEP 206a (e.g., as an internal SEP) and allows the coupling of a number of the drives 206d to the SEP 206a that exceeds a maximum number of drives that may be coupled to the SEP 206a without the expander. For example, one of skill in the art will recognize that some backplanes include 8 lanes for coupling drives to the SEP such that an SEP may be used if 8 or less drives are to be coupled to the backplane, while an expander with an SEP may be used if more than 8 drives are to be coupled to the backplane. While the backplane 206 has been described as including specific components, one of skill in the art will recognize that other components may be included on the backplane and help to provide the functionality discussed below without departing from the scope of the present disclosure. In an embodiment, the SEP 206a and optionally other components on the backplane 206 (e.g., the memory 206b) provide a management controller for the backplane 206. In an embodiment, the management controller for the backplane 206 is operable to communicate with the storage controller 202 and the service processor 204 to exchange information such as, for example, drive status, backplane inventory, cable inventory, LED operation, and a variety of other information known in the art.

A backplane 210 includes a SEP 210a that is coupled to the SEP 206a. In an embodiment, the SEP 210a may be coupled to the SEP 206a through one or more buses 212a that may be one or more Inter-Integrated Circuit (I²C) buses and/or one or more Serial Attached Small Computer System Interface (SAS) buses. In an embodiment, the SEP 210a may be coupled to the SEP 206a through one or more buses 212b that may be one or more I²C buses. The backplane 210 may also include a memory 210b coupled to the SEP 210a. In an embodiment, the memory 210b may be the memory 114 described above with reference to FIG. 1. In an embodiment, the memory 210b is a non-transitory, computer-readable medium that may include computer-readable instructions that are executable by a processor (e.g., the SEP 210a) to perform a number of functions (described in further detail below.)

The backplane 210 also includes a plurality of drive connectors 210c that are operable to couple a plurality of drives 210d to the SEP 210a. In an embodiment, the drives 210d may be mass storage devices (e.g., hard drives). However, a variety of other drives or IHS components known in the art may be used without departing from the scope of the present disclosure. In an embodiment, the backplane 210 may include an expander. In an embodiment, the expander is a SAS expander. In an embodiment, the expander includes the SEP 210a (e.g., an internal SEP) and allows the coupling of a number of the drives 210d to the SEP 210a that exceeds a maximum number of drives that may be coupled to the SEP 210a without the expander. For example, one of skill in the art will recognize that some backplanes include 8 lanes for coupling drives to the SEP such that an SEP may be used if 8 or less drives are to be coupled to the backplane, while an expander with an SEP may be used if more than 8 drives are to be coupled to the backplane. Furthermore, one of skill in the art will recognize that the one or more buses 212a may be one or more SAS buses when an expander is used on the backplane 210, while the one or more buses 212a may be one or more I²C buses when no expander is used on the backplane 210. While the backplane 210 has been described as including specific components, one of skill in the art will recognize that other components may be included on the backplane and help to provide the functionality discussed below without departing from the scope of the present disclosure. In an embodiment, the SEP 210a and optionally other components on the backplane 210 (e.g., the memory 210b) provide a management controller for the backplane 210. In an embodiment, the management controller for the backplane 210 is operable to communicate with a storage controller and a service processor to exchange information such as, for example, drive status, backplane inventory, cable inventory, LED operation, and a variety of other information known in the art.

A backplane 214 includes a SEP 214a that is coupled to the SEP 206a. In an embodiment, the SEP 214a may be coupled to the SEP 206a through one or more buses 216a that may be one or more Inter-Integrated Circuit (I²C) buses and/or one or more Serial Attached Small Computer System Interface (SAS) buses. In an embodiment, the SEP 214a may be coupled to the SEP 206a through one or more buses 216b that may be one or more I²C buses. As can be seen in FIG. 2a, the SEP 214a is coupled to the SEP 206a in parallel with the SEP 210a. The backplane 214 may also include a memory 214b coupled to the SEP 214a. In an embodiment, the memory 214b may be the memory 114 described above with reference to FIG. 1. In an embodiment, the memory 214b is a non-transitory, computer-readable medium that may include computer-readable instructions that are executable by a processor (e.g., the SEP 214a) to perform a number of functions (described in further detail below.)

The backplane 214 also includes a plurality of drive connectors 214c that are operable to couple a plurality of drives 214d to the SEP 214a. In an embodiment, the drives 214d may be mass storage devices (e.g., hard drives). However, a variety of other drives or IHS components known in the art may be used without departing from the scope of the present disclosure. In an embodiment, the backplane 214 may include an expander. In an embodiment, the expander is a SAS expander. In an embodiment, the expander includes the SEP 214a (e.g., an internal SEP) and allows the coupling of a number of the drives 214d to the SEP 214a that exceeds a maximum number of drives that may be coupled to the SEP 214a without the expander. For example, one of skill in the art will recognize that some backplanes include 8 lanes for coupling drives to the SEP such that an SEP may be used if 8 or less drives are to be coupled to the backplane, while an expander with an SEP may be used if more than 8 drives are to be coupled to the backplane. Furthermore, one of skill in the art will recognize that the one or more buses 216a may be one or more SAS buses when an expander is used on the backplane 214, while the one or more buses 216a may be one or more I²C buses when no expander is used on the backplane 214. While only one backplane 214 has been illustrated having an SEP 214a coupled to the SEP 206a in parallel with the SEP 210a, one of skill in the art will recognize that a plurality of backplanes may each include an SEP coupled to the SEP 206a in parallel with the SEP 210a, the Sep 214a, and to further SEPs up to the limits of the hardware, if any, without departing from the scope of the present disclosure. While the backplane 214 has been described as including specific components, one of skill in the art will recognize that other components may be included on the backplane and help to provide the functionality discussed below without departing from the scope of the present disclosure. In an embodiment, the SEP 214a and optionally other components on the backplane 214 (e.g., the memory 214b) provide a management controller for the backplane 214. In an embodiment, the management controller for the backplane 214 is operable to communicate with a storage controller and a service processor to exchange information such as, for example, drive status, backplane inventory, cable inventory, LED operation, and a variety of other information known in the art.

A backplane 218 includes a SEP 218a that is coupled to the SEP 210a. In an embodiment, the SEP 218a may be coupled to the SEP 210a through one or more buses 220a that may be one or more Inter-Integrated Circuit (I²C) buses and/or one or more Serial Attached Small Computer System Interface (SAS) buses. In an embodiment, the SEP 218a may be coupled to the SEP 210a through one or more buses 220b that may be one or more I²C buses. As can be seen in FIG. 2a, the SEP 218a is coupled in series with the SEP 210a. The backplane 218 may also include a memory 218b coupled to the SEP 218a. In an embodiment, the memory 218b may be the memory 114 described above with reference to FIG. 1. In an embodiment, the memory 218b is a non-transitory, computer-readable medium that may include computer-readable instructions that are executable by a processor (e.g., the SEP 218a) to perform a number of functions (described in further detail below.)

The backplane 218 also includes a plurality of drive connectors 218c that are operable to couple a plurality of drives 218d to the SEP 218a. In an embodiment, the drives 218d may be mass storage devices (e.g., hard drives). However, a variety of other drives or IHS components known in the art may be used without departing from the scope of the present disclosure. In an embodiment, the backplane 218 may include an expander. In an embodiment, the expander is a SAS expander. In an embodiment, the expander includes the SEP 218a (e.g., an internal SEP) and allows the coupling of a number of the drives 218d to the SEP 218a that exceeds a maximum number of drives that may be coupled to the SEP 218a without the expander. For example, one of skill in the art will recognize that some backplanes include 8 lanes for coupling drives to the SEP such that an SEP may be used if 8 or less drives are to be coupled to the backplane, while an expander with an SEP may be used if more than 8 drives are to be coupled to the backplane. Furthermore, one of skill in the art will recognize that the one or more buses 220a may be one or more SAS buses when an expander is used on the backplane 218, while the one or more buses 220a may be one or more I²C buses when no expander is used on the backplane 218. While only one backplane 218 has been illustrated having an SEP 218a coupled in series (e.g., with the SEP 210a), one of skill in the art will recognize that a plurality of backplanes may each include an SEP coupled in series the SEP 210a, the SEP 218a, and to further SEPs in the chain (e.g., up to the limits of the hardware) without departing from the scope of the present disclosure. Furthermore, any or all of a plurality of SEPs coupled in series may be coupled to or included in expanders. While the backplane 218 has been described as including specific components, one of skill in the art will recognize that other components may be included on the backplane and help to provide the functionality discussed below without departing from the scope of the present disclosure. In an embodiment, the SEP 218a and optionally other components on the backplane 218 (e.g., the memory 218b) provide a management controller for the backplane 218. In an embodiment, the management controller for the backplane 218 is operable to communicate with a storage controller and a service processor to exchange information such as, for example, drive status, backplane inventory, cable inventory, LED operation, and a variety of other information known in the art.

Figure 2:
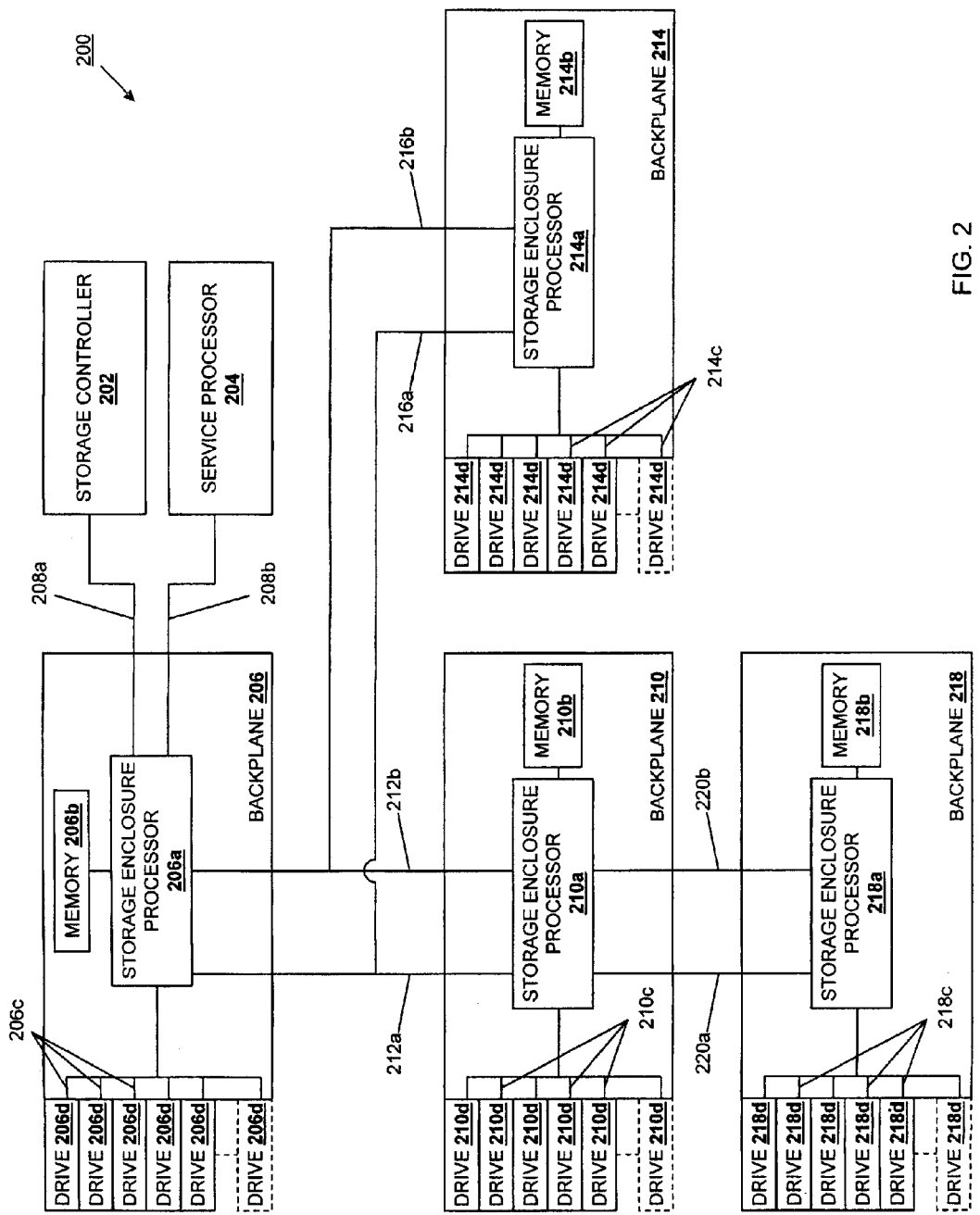
FIG. 2 is a schematic view illustrating an embodiment of a storage subsystem backplane management system.
Figure 3:
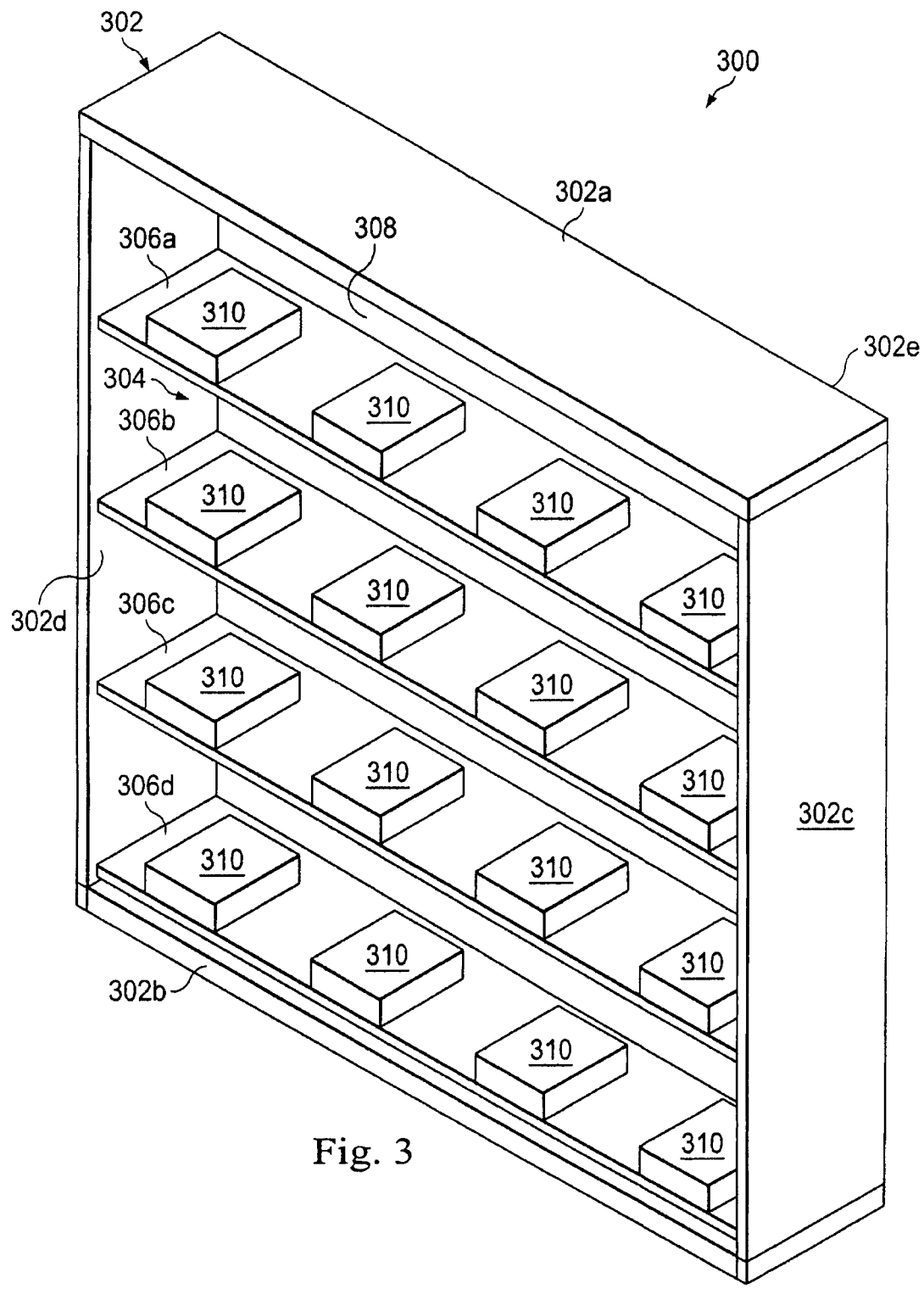
FIG. 3 is a perspective view illustrating an embodiment of some of the physical hardware that may be used in the storage subsystem backplane management system of FIG. 2.

Referring now to FIG. 3, a view of an embodiment of some of the physical hardware that may be used in a storage subsystem backplane management system 300, which may be the storage subsystem backplane management system 200, is illustrated. The system 300 includes a chassis 302 having a top wall 302a, a bottom wall 302b located opposite the chassis 302 from the top wall 302a, a pair of opposing side walls 302c and 302d that extend between the top wall 302a and the bottom wall 302b, and a rear wall 302d that extends between the top wall 302a, the bottom wall 302b, and the side walls 302c and 302d. In an embodiment, the chassis 302 may includes a front wall or door (not illustrated) that is located opposite the rear wall and extends between the top wall 302a, the bottom wall 302b, and the side walls 302c and 302d. A chassis housing 304 is defined between the top wall 302a, the bottom wall 302b, the side walls 302c and 302d, and the rear wall 302e. In an embodiment the chassis 302 may be the chassis 116, described above with reference to FIG. 1. A plurality of backplanes 306a, 306b, 306c, and 306d are located in the chassis housing 304. In an embodiment, the backplanes 306a, 306b, 306c, and/or 306d may be the backplanes 206, 210, 214, and/or 218 discussed above with reference to FIG. 2. In an embodiment, each of the backplanes 306a, 306b, 306c, and 306d may be physically connected to a board 308 that located in the chassis housing 304 with power connectors (not illustrated), mounting brackets (not illustrated), and/or variety of other connections known in the art. In an embodiment, the board 308 may include or may be coupled to a storage controller (e.g., the storage controller 202 described above with reference to FIG. 2) and/or the service processor (e.g., the service processor 204 described above with reference to FIG. 2). A plurality of drives 310 are coupled to the backplanes 306a, 306b, 306c, and 306d through drive connectors (e.g., the drive connectors 206c, 210c, 214c, and/or 218c described above with reference to FIG. 2). In an embodiment, the drives 310 may be the drives 206d, 210d, 214d, and/or 218d described above with reference to FIG. 2. While specific components and hardware have been illustrated and described with reference to FIG. 3, this is not meant to limit the present disclosure, and one of skill in the art will recognize that a plurality of different components, hardware, and structures may be used in addition to, or substituted with, those illustrated and described with departing from the scope of the present disclosure. For example, the chassis 302 has been illustrated as only housing the backplanes 306a, 306b, 306c, and 306d, board, 308, and drives 310. However, the chassis 302 may also house additional server components known in the art such as, for example, the IHS components described above with reference to FIG. 1.

Figure 4:
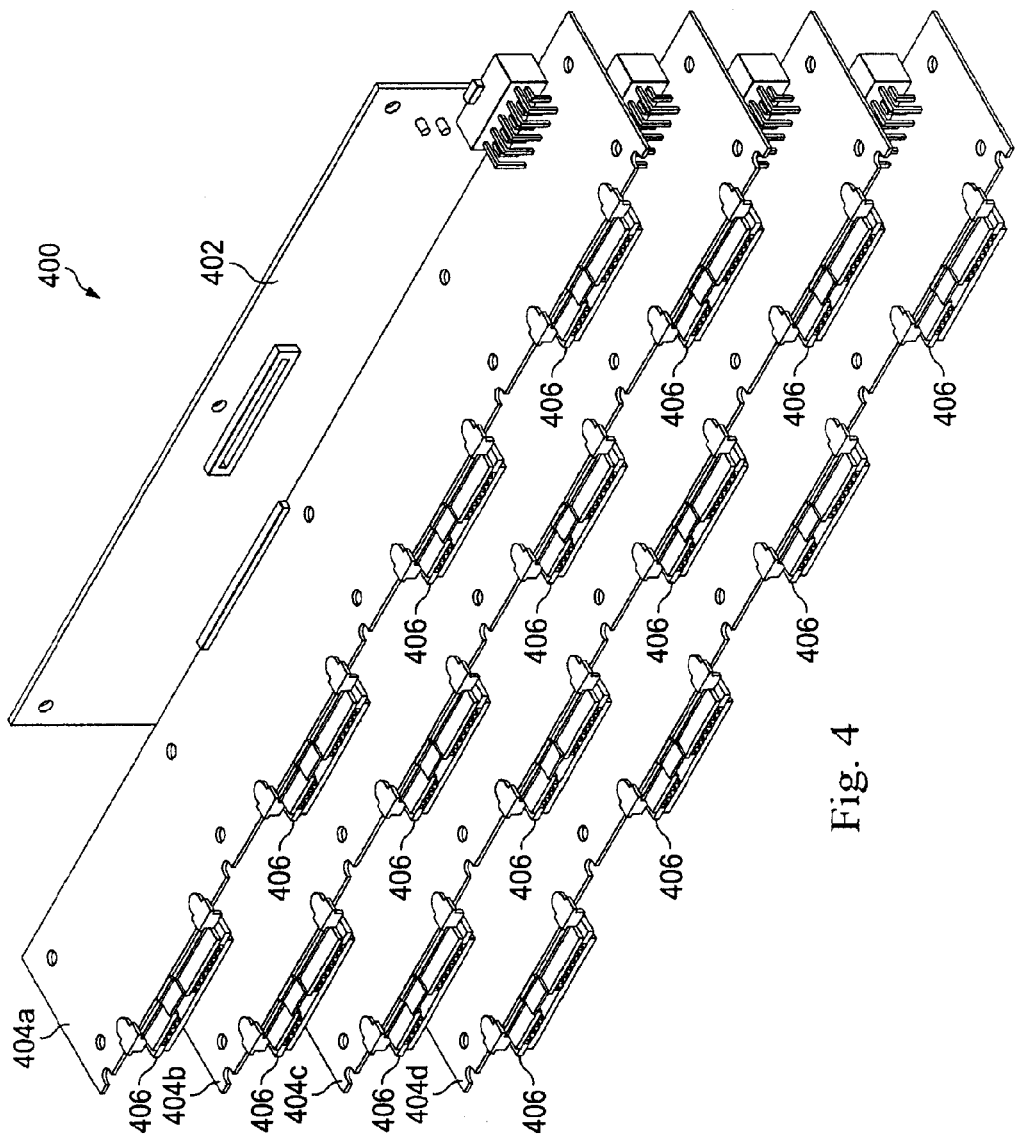
FIG. 4 is a perspective view illustrating an embodiment of some alternative physical hardware that may be used in the storage subsystem backplane management system of FIG. 2.

Referring now to FIG. 4, a view of an embodiment of some alternative physical hardware that may be used on the storage subsystem backplane management system 300, described above with reference to FIG. 3, is illustrated. FIG. 4 illustrates a backplane expander 400 that includes an expander board 402. A plurality of boards 404a, 404b, 404c, and 404d are coupled to the expander board 402, each including a plurality of drive connectors 406 that are operable to couple to drives (e.g., the drives 206d, 210d, 214d, and/or 218d, described above with reference to FIG. 2, and/or the drives 310, described above with reference to FIG. 3.) In an embodiment, the backplane expander 400 may replace one or more of the backplanes 306a, 306b, 306c, and/or 306d in the chassis 302, described above with reference to FIG. 3. For example, as described above with reference to FIG. 2, the backplanes 306a, 306b, 306c, and/or 306d may be used if 8 or less drives are to be used on a particular backplane, while the backplane expander 400 may be used if more than 8 drives are to be used on a particular backplane. In an embodiment, the expander backplane 400 may couple to the board 308, described above with reference to FIG. 3, with power connectors, mounting brackets, and/or other connections known in the art. In an embodiment, the expander backplane 400 may couple to a storage controller (e.g., the storage controller 202 described above with reference to FIG. 2) using one or more mini-SAS cables. In an embodiment, the expander backplane 400 may couple to a service processor (e.g., the service processor 204 described above with reference to FIG. 2) using a backplane-to-motherboard cable. While the backplane expander 400 has been described as including an expander board 402, this is not meant to limit the present disclosure, and one of skill in the art will recognize that the expander may be physically present on a backplane itself (e.g., on the backplanes 306a, 306b, 306c, and/or 306d) without departing from the scope of the present disclosure.

Figure 5A:
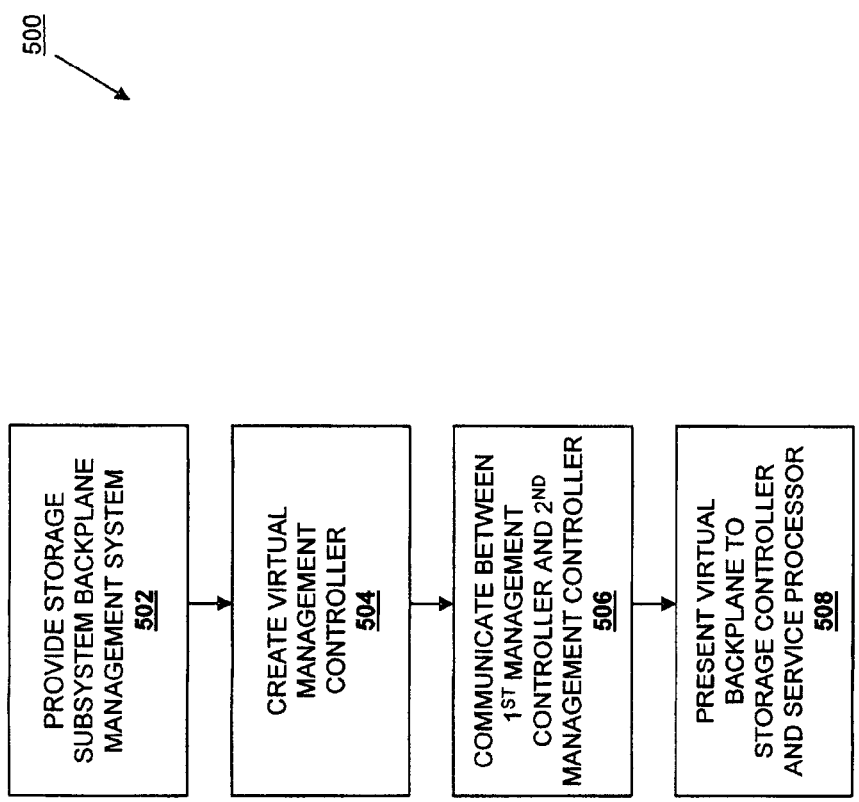
FIG. 5a is a flow chart illustrating an embodiment of a method for managing storage subsystem backplanes.
Figure 5B:
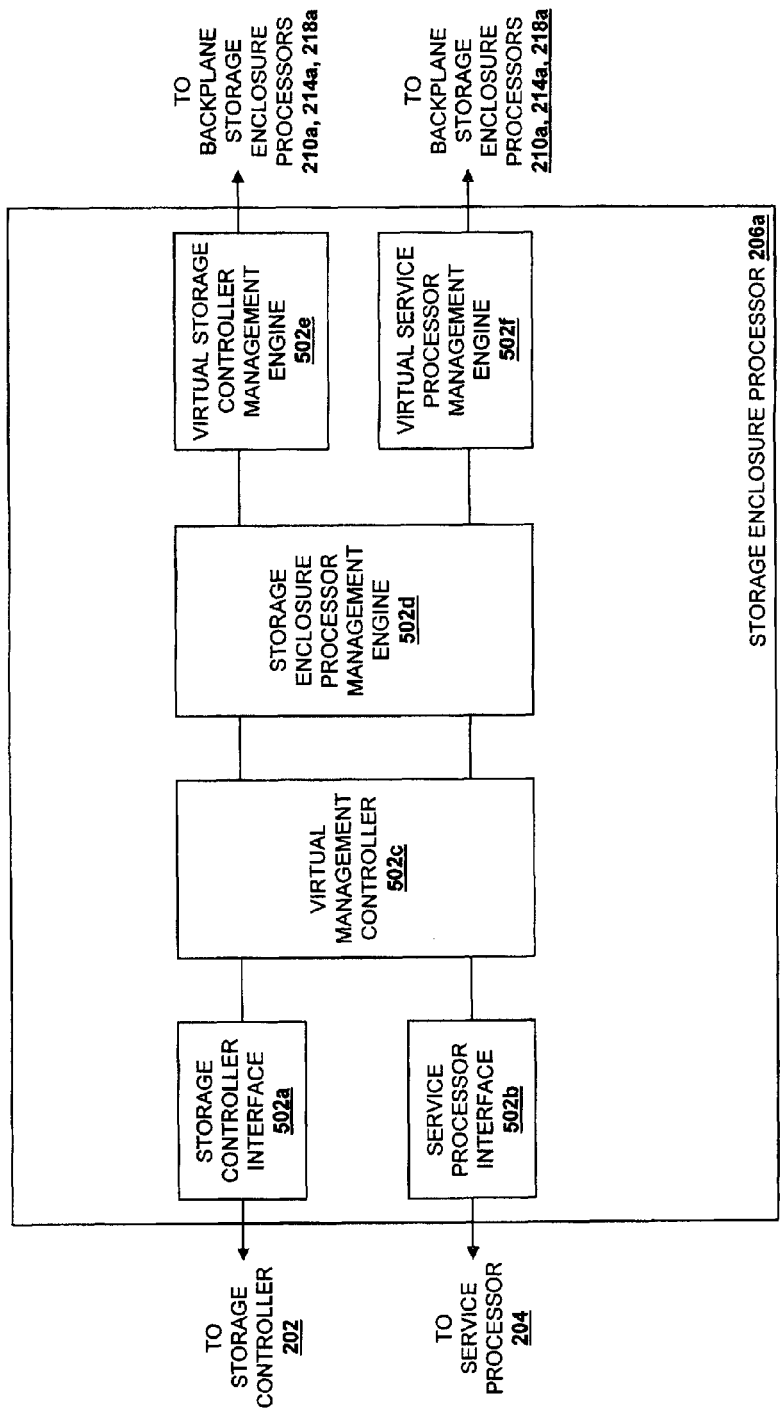
FIG. 5b is a schematic view illustrating components of the storage subsystem backplane management system.

Referring now to FIGS. 2, 5a, and 5b, a method 500 for managing storage subsystem backplanes is illustrated. The method 500 begins at blocks 502 and 504 where a storage subsystem backplane management system is provided and a virtual management controller is created. In an embodiment, the storage subsystem backplane management system 200 may be provided. The SEP 206a may access the memory 206b on backplane 206 for instructions that, when executed by the SEP 206a, provide a storage controller interface 502a that couples the storage controller 202 to the SEP 206a, a service processor interface 502b that couples the service processor 204 to the SEP 206a, a virtual management controller 502c that is coupled to each of the storage controller interface 502a and the service processor interface 502b, an SEP management engine 502d that is coupled to the virtual management controller 502c, and a virtual storage controller management engine 502e and virtual service processor management engine 502f (or virtual Environment Management Controller interface) that are each coupled to the SEP management engine 502d and to the SEPs 210a, 214a, and 218a on backplanes 210, 214, and 218, respectively, as illustrated schematically in FIG. 5b. In an embodiment, the storage controller interface 502a and the service processor interface 502b may include physical hardware on the backplane 206 or SEP 206a. In an embodiment, the virtual management controller 502c is located in the physical management controller for the backplane 206. In an embodiment, the virtual storage controller management engine 502e and virtual service processor management engine 502f are architected into the functionality of the SEP 206a. In an embodiment, the virtual storage controller management engine 502e and virtual service processor management engine 502f are architected into the functionality of the SEP 206a that is internal to an expander on the backplane 206.

The SEP 206a may then communicate with the storage controller 202 through the storage controller interface 502a using the virtual management controller 502c, and with the service processor 204 through the service processor interface 502b using the virtual management controller 502c, as described in further detail below. Furthermore, the SEP 206a may also use the virtual storage controller management engine 502e and the virtual service processor management engine 502f to communicate with any SEPs (e.g., SEPs 210a, 214a, and 218a) that are 'downstream', or opposite the SEP 206a from the storage controller 202 and service processor 204, from the SEP 206a, as described in further detail below. In an embodiment, the SEP management engine 502d is operable to manage each of the backplanes 210, 214, and 218 through its coupling and communication with the SEPs 210a, 214a, and 218 in order to monitor, aggregate, and order information related to the plurality of drives 206d, 210d, 214d, and 218d. That information may then be provided to the virtual management controller 502c, which is operable to present to the storage controller 202 and the service processor 204 a 'virtual backplane' that includes each of the plurality of drives 206d, 210d, 214d, and 218d, as discussed in further detail below. While the 'virtual backplane' may be presented to the storage controller 202 and the service processor 204 using a number of methods, one of skill in the art will recognize that any method which allows the storage controller 202 and the service processor 204 to communicate with the SEP 206a as one logical management controller that manages all of the drives in the storage subsystem will fall within the scope of the present disclosure.

The method 500 then proceeds to blocks 506 and 508 where a first management controller communicates with a second management controller and a virtual backplane is presented to a storage controller and service processor. As stated above, the SEP 206a may use the virtual storage controller management engine 502e and the virtual service processor management engine 502f to communicate with any SEPs (e.g., SEPs 210a, 214a, and 218a) that are 'downstream' from the SEP 206a. For example, the virtual storage controller management engine 502e may communicate with the SEPs 210a, 214a, and/or 218a over an SAS bus or an I²C bus, and the virtual service processor management engine 502f may communicate with the SEPs 210a, 214a, and/or 218a over an I²C bus. One of skill in the art will recognize that communication between the SEP 206a and the SEP 218a (or any further SEPs coupled in series to the SEP 218a) over an SAS bus may be a direct communication. In an embodiment, communication between the SEP 206a using the virtual storage controller management engine 502e and/or the virtual service processor management engine 502f and any SEP 210a, 214a, or 218a appears to the SEP 210a, 214a, or 218a to be coming directly from the storage controller 202 and/or the service processor 204, respectively.

For example, the SEP 206a may receive communications from the storage controller 202 and/or the service processor 204 through the storage controller interface 502a and/or the service processor interface 502b. As described above, the virtual management controller 502c presents the storage controller 202 and the service processor 204 with a virtual backplane that includes each of the plurality of drives 206d, 210d, 214d, and 218d. Thus, in one embodiment, the storage controller 202 and/or the service processor 204 are presented with a single virtual backplane (that appears to the storage controller 202 and the service processor 204 to be a single physical backplane) that includes all of the plurality of drives 206d, 210d, 214d, and 218d contiguously numbered (e.g., if there are 10 of each of the drives 206d, 210d, 214d, and 218d, the virtual backplane SEP 502c may present the storage controller 202 and the service processor 204 with a single virtual backplane having drives numbered 0, 1, 2, 3, and through 39). In an embodiment, the SEP 206a provides the virtual management controller 502c by virtualizing a Storage Enclosure Services (SES) engine that can control the downstream SEPs and make them transparent to the upstream storage controller. The storage controller 202 and/or the service processor 204 may then communicate with the virtual management controller 502c in order to communicate with any of the plurality of drives 206d, 210d, 214d, and 218d as they would with any physical management controller. The communications received from the storage controller 202 and/or the service processor 204 are then provided to the SEP management engine 502d, which determines the location of the drive that the storage controller 202 and/or the service processor 204 is trying to communicate with, and uses the virtual storage controller management engine 502e and/or the virtual service processor management engine 502f to provide that communication to the SEP that communicates with that drive (e.g., the SEP 210a for drives 210d, the SEP 214a for drives 214d, or the SEP 218a for drives 218e). If the communication is for one of the drives 206d, the SEP management engine 502d may provide that communication to the SEP 206a.

As stated above, the SEP 206a is able to 'mimic' the storage controller 202 and/or the service processor 204 by using the virtual storage controller management engine 502e and/or the virtual service processor management engine 502f to communicate with the SEPs. In one embodiment, such 'mimicking' may be accomplished by taking the communications from the storage controller 202 and/or the service processor 204 and storing those communications in a registry associated with the SEP 206a, and then instructing the SEP for which the communication should be sent to communicate with that registry. However, one of skill in the art will recognize that the SEP 206a may 'mimic' the storage controller 202 and/or the service processor 204 in a variety of other manners known in the art without departing from the scope of the present disclosure. Thus, when the SEP 206a provides communications from the storage controller 202 and/or the service processor 204 to any of the SEPs 210a, 214a, or 218a, those SEPs 210a, 214a, or 218a receive those communications as through they are communicating directly with the storage controller 202 and/or the service processor 204.

In another example, the SEP 206a may receive communications from the SEPs 210a, 214a, or 218a through the virtual storage controller management engine 502e and/or the virtual service processor management engine 502f. Those communications are then provided to the SEP management engine 502d, which may determine which drive they are associated with on the virtual backplane that is presented by the virtual management controller 502c to the storage controller 202 and the service processor 204. For example, each backplane 206, 210, 214, and 218 may include 10 drives, and the fourth drive 218d on backplane 218 may be associated with drive 34 (of 40) on the virtual backplane. Communications from the SEP 218a that are associated with that drive are provided by the virtual management controller 502c to the storage controller 202 and/or the service processor 204 as if it were related to a particular one of 40 drives on a single physical backplane. In one embodiment, this may be accomplished by taking the communications from the SEP 218a about the drive and storing those communications in a registry associated with the SEP 206a, and then instructing the storage controller 202 and/or service processor 204 to communicate with that registry. However, one of skill in the art will recognize that the this may be accomplished in a variety of other manners known in the art without departing from the scope of the present disclosure. Thus, when the SEP 206a provides communications from the SEPs 210a, 214a, or 218a to the storage controller 202 and/or the service processor 204, the storage controller 202 and/or the service processor 204 receive those communications as through they are communicating directly with an SEP on a single physical backplane that includes all of the drives in the storage subsystem.

Thus, a system and method have been described that provide for storage subsystem backplane management by creating a virtual management controller that presents a storage controller and service processor with a virtual backplane that includes all the drives that are located on physical backplanes in the storage subsystem. The system and method also provide a virtual storage controller management engine and a virtual service processor management engine to communicate with the SEPs on the physical backplanes in the storage subsystem such that each of those SEPs operate as though they are communicating directly with the storage controller and the service processor. One of skill in the art will recognize that the system and method allows the use of multiple backplanes in a storage subsystem while also allowing the use of legacy hardware (e.g., legacy storage controllers, service processors, and SEPs downstream from the SEP that implements the system and method) in that storage subsystem.

Figure 6:
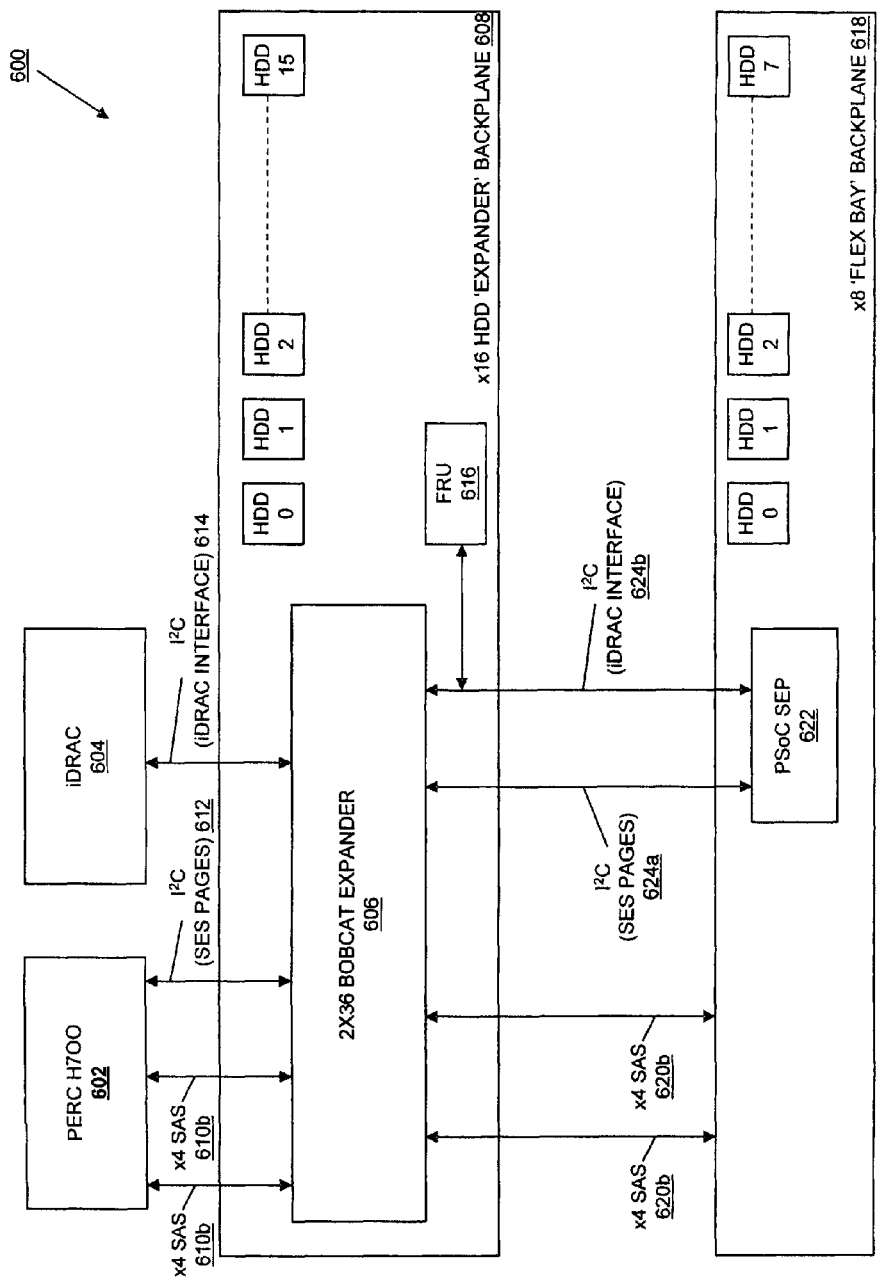
FIG. 6 is a schematic view illustrating a specific embodiment of a storage subsystem backplane management system.

Referring now to FIG. 6, a specific embodiment of a storage subsystem backplane management system is 600 illustrated. The system 600 includes a PERC H700 storage controller 602 and an iDRAC service processor 604. The PERC H700 storage controller 602 is coupled to an expander 606 on a x16 Hard Disk Drive (HDD) expander backplane 608 through a pair of x4 SAS buses 610a and 610b and an I$^2$C bus 612 operable to communicate using Storage Enclosure Services (SES) pages, and the iDRAC service processor 604 is coupled to the expander 606 on the x16 Hard Disk Drive (HDD) expander backplane 608 through an I$^2$C bus 614 operable to communicate using an inventory management interface. The x16 Hard Disk Drive (HDD) expander backplane 608 includes 16 HDDs numbered HDD 0 through HDD 15, and a Field Replaceable Unit (FRU) 616. The expander 606 is coupled to a x8 flex bay backplane 618 through a pair of x4 SAS buses 620a and 620b, and to a Programmable System on Chip (PSoC) SEP 622 through an I$^2$C bus 624a operable to communicate using SES pages, and an I$^2$C bus 624b operable to communicate using an inventory management interface. The FRU 616 is also coupled to the I²C bus 624b. The x8 flex bay backplane 618 includes 8 HDDs numbered HDD 0 through HDD 7.

The expander 606 communicates with the PERC H700 storage controller 602 acting as a virtual backplane SEP via SES pages over an I²C bus, sending drive presence and controlling the drive online and fault LEDs. Thus, the expander 606 aggregates drive state and cable presence data, from multiple SES over I²C and SES over SAS channels, into the virtual backplane SEP. The expander 606 may use its internal expander SEP to mimic a PSoC SEP. The PSoC SEP 622 on the x8 flex bay backplane 618 may be passive, and the expander 606 mimics a PERC for the purposes of communicating with the PSoC SEP 622. Information received by the expander 606 from the PSoC SEP 622 is presented to the PERC H700 storage controller 602 as if it comes from one SEP in native control of all 24 HDDs' management functionality (e.g., drive presence monitoring, online, fault LED controller, etc.) The expander 606 also communicates drive, cable presence, and board FRU information with the iDRAC service processor 604 over the I²C bus 614. The expander 606 communicates with the PSoC SEP 622 over the I²C buses 624a and 624b and mimics an iDRAC service processor to gain drive presence and FRU information. Thus, as described in detail above, in operation, the PERC H700 storage controller 602 and the iDRAC service processor 604 are presented with a single virtual backplane that includes 24 drives (sixteen from the x16 Hard Disk Drive (HDD) expander backplane 608 and eight from x8 flex bay backplane 618). Furthermore, communications from the PERC H700 storage controller 602 and/or the iDRAC service processor 604 about the HDDs on the x8 flex bay backplane 618 to the PSoC SEP 622 are conducted as though they are received directly from the PERC H700 storage controller 602 and/or the iDRAC service processor 604 and not through the expander 606.

Furthermore, the first management controller for the first backplane in the system (e.g., the SEP 206a and optionally the memory 206b for backplane 206, or the expander 606) may be location aware to, for example, mask downstream management controllers (e.g., expander SEPs, PSoC SEPs, etc.) In one embodiment, the first management controller may be location aware by checking its backplanes storage bay ID (e.g., having a bay ID of 0 or 1 may indicate to the first management controller that it is communicating directly with the physical storage controller and physical service processor.) In another embodiment, the first management controller may be location aware by checking its cabling connections (e.g., some industry standard cables may indicate that the first management controller is communicating directly with the physical storage controller and physical service processor.) Also, the first management controller may use methods to determine whether it is communicating with an expander SEP (e.g., when communication occurs over a SAS bus) or a SEP (e.g., when communication occurs over an I²C bus.) One of skill in the art will recognize that the architecture proposed above supports an unlimited number of expander based (e.g., with internal SEPs) 'downstream' backplanes behind one storage controller and a primary expander backplane, while the number of SEP (e.g. PSoC SEP) based backplanes is only limited by the total number of I²C slave devices allowed on one I²C bus for proper electrical operation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage subsystem backplane management system, comprising:
   a storage controller;
   a service processor;
   a first backplane including a first management controller that is coupled to the storage controller and the service processor, wherein the first backplane is configured to couple a plurality of first mass storage drives to the first management controller; and
   a second backplane including a second management controller that is coupled to the first management controller, wherein the second backplane is configured to couple a plurality of second mass storage drives to the second management controller;
   wherein the first management controller is configured to:
      create a virtual management controller and at least one virtual management engine;
      use the virtual management controller to present the storage controller and the service processor a virtual backplane that appears to the storage controller and the service processor as a single, physical backplane including each of the plurality of first mass storage drives and each of the plurality of second mass storage drives when the plurality of first mass storage drives are coupled to the first management controller and the plurality of second mass storage drives are coupled to the second management controller;
      communicate with the second management controller using the at least one virtual management engine such that drive management communications from at least one of the storage controller and the service processor to one of the plurality of second mass storage drives appear to the second management controller to be coming from the at least one of the storage controller and the service processor and are used by the second management controller to manage the one of the plurality of second mass storage drives to provide at least one of drive presence monitoring, drive Light Emitting Device (LED) control, and drive Field Replaceable Unit (FRU) information retrieval; and
      communicate with at least one of the storage controller and the service processor using the virtual management controller such that communications from the second management controller that are related to the management of the one of the plurality of second mass storage drives appear to the at least one of the storage controller and the service processor to be coming from the one of the plurality of second mass storage drives.

2. The system of claim 1, wherein the drive management communications provided by the at least one virtual management engine and the virtual management controller between the second management controller and the at least one of the storage controller and the service processor allow the at least one of the storage controller and the service processor to control drive management functions of each of the plurality of second mass storage drives separately.

3. The system of claim 1, wherein the virtual backplane appears to the storage controller and the service processor as the single, physical backplane including each of the plurality of first mass storage drives and each of the plurality of second mass storage drives contiguously numbered.

4. The system of claim 1, wherein the at least one virtual management engine includes a virtual storage controller management engine that is configured to communicate with the second management controller over either an Inter-Integrated Circuit (I²C) bus or a Serial Attached Small Computer System Interface (SAS) bus, and the at least one virtual management engine also includes a virtual service processor management engine that is configured to communicate with the second management controller over an I²C bus.

5. The system of claim 1, wherein the first backplane includes an expander.

6. The system of claim 1, further comprising:
a third backplane including a third management controller that is coupled to the first management controller and in parallel with the second management controller, wherein the third backplane is configured to couple a plurality of third mass storage drives to the third management controller;
wherein the first management controller is configured to:
use the virtual management controller to present the storage controller and the service processor the virtual backplane that appears to the storage controller and the service processor as the single, physical backplane including each of the plurality of first mass storage drives, each of the plurality of second mass storage drives, and each of the plurality of third mass storage drives when the plurality of first mass storage drives are coupled to the first management controller, the plurality of second mass storage drives are coupled to the second management controller, and the plurality of third mass storage drives are coupled to the third management controller;
communicate with the third management controller using the at least one virtual management engine such that drive management communications from at least one of the storage controller and the service processor to one of the plurality of third mass storage drives appear to the third management controller to be coming from the at least one of the storage controller and the service processor and are used by the third management controller to manage the one of the plurality of third mass storage drives; and
communicate with at least one of the storage controller and the service processor using the virtual management controller such that communications from the third management controller that are related to the management of the one of the plurality of third mass storage drives appear to the at least one of the storage controller and the service processor to be coming from the one of the plurality of third mass storage drives.

7. The system of claim 1, further comprising:
a third backplane including a third management controller that is coupled to the first management controller and in series with the second management controller, wherein the third backplane is configured to couple a plurality of third mass storage drives to the third management controller;
wherein the first management controller is configured to:
use virtual management controller to present the storage controller and the service processor the virtual backplane that appears to the storage controller and the service processor as the single, physical backplane including each of the plurality of first mass storage drives, each of the plurality of second mass storage drives, and each of the plurality of third mass storage drives when the plurality of first mass storage drives are coupled to the first management controller, the plurality of second mass storage drives are coupled to the second management controller, and the plurality of third mass storage drives are coupled to the third management controller;
communicate with the third management controller using the at least one virtual management engine such that drive management communications from at least one of the storage controller and the service processor to one of the plurality of third mass storage drives appear to the third management controller to be coming from the at least one of the storage controller and the service processor and are used by the third management controller to manage the one of the plurality of third mass storage drives; and
communicate with at least one of the storage controller and the service processor using the virtual management controller such that communications from the third management controller that are related to the management of the one of the plurality of third mass storage drives appear to the at least one of the storage controller and the service processor to be coming from the one of the plurality of third mass storage drives.

8. An information handling system, comprising:
a chassis;
a storage controller housed in the chassis;
a service processor housed in the chassis;
a first backplane housed in the chassis and including a first management controller that is coupled to the storage controller and the service processor, wherein a plurality of first mass storage drives are coupled to the first management controller through the first backplane; and
a second backplane housed in the chassis and including a second management controller that is coupled to the first management controller, wherein a plurality of second mass storage drives are coupled to the second management controller through the second backplane;
wherein the first management controller is configured to:
create a virtual management controller and at least one virtual management engine;
use the virtual management controller to present the storage controller and the service processor a virtual backplane that appears to the storage controller and the service processor as a single, physical backplane including each of the plurality of first mass storage drives and each of the plurality of second mass storage drives;
communicate with the second management controller using the at least one virtual management engine such that drive management communications from at least one of the storage controller and the service processor to one of the plurality of second mass storage drives appear to the second management controller to be coming from the at least one of the storage controller and the service processor and are used by the second management controller to manage the one of the plurality of second mass storage drives to provide at least one of drive presence monitoring, drive Light Emitting Device (LED) control, and drive Field Replaceable Unit (FRU) information retrieval; and
communicate with at least one of the storage controller and the service processor using the virtual management controller such that communications from the second management controller that are related to the management of the one of the plurality of second mass storage drives appear to the at least one of the storage controller and the service processor to be coming from the one of the plurality of second mass storage drives.

9. The system of claim 8, wherein the drive management communications provided by the at least one virtual management engine and the virtual management controller between the second management controller and the at least one of the storage controller and the service processor allow the at least one of the storage controller and the service processor to control drive management functions of each of the plurality of second mass storage drives separately.

10. The system of claim 8, wherein the virtual backplane appears to the storage controller and the service processor as the single, physical backplane including each of the plurality of first mass storage drives and each of the plurality of second mass storage drives contiguously numbered.

11. The system of claim 9, wherein the at least one virtual management engine includes a virtual storage controller management engine that is configured to communicate with the second management controller over either an Inter-Integrated Circuit ($I^2C$) bus or a Serial Attached Small Computer System Interface (SAS) bus, and the at least one virtual management engine also includes a virtual service processor management engine that is configured to communicate with the second management controller over an $I^2C$ bus.

12. The system of claim 8, wherein the first backplane includes an expander.

13. The system of claim 8, further comprising:
a third backplane housed in the chassis and including a third management controller that is coupled to the first management controller and in parallel with the second management controller, wherein a plurality of third mass storage drives are coupled to the third management controller through the third backplane;
wherein the first management controller is configured to:
use the virtual management controller to present the storage controller and the service processor the virtual backplane that appears to the storage controller and the service processor as the single, physical backplane including each of the plurality of first mass storage drives, each of the plurality of second mass storage drives, and each of the plurality of third mass storage drives;
communicate with the third management controller using the at least one virtual management engine such that drive management communications from at least one of the storage controller and the service processor to one of the plurality of third mass storage drives appear to the third management controller to be coming from the at least one of the storage controller and the service processor and are used by the third management controller to manage the one of the plurality of third mass storage drives; and
communicate with at least one of the storage controller and the service processor using the virtual management controller such that communications from the third management controller that are related to the management of the one of the plurality of third mass storage drives appear to the at least one of the storage controller and the service processor to be coming from the one of the plurality of third mass storage drives.

14. The system of claim 8, further comprising:
a third backplane housed in the chassis and including a third management controller that is coupled to the first management controller and in series with the second management controller, wherein a plurality of third mass storage drives are coupled to the third management controller through the third backplane;
wherein first management controller is configured to:
use the virtual management controller to present the storage controller and the service processor a virtual backplane that appears to the storage controller and the service processor as the single, physical backplane including each of the plurality of first mass storage drives, each of the plurality of second mass storage drives, and each of the plurality of third mass storage drives;
communicate with the third management controller using the at least one virtual management engine such that drive management communications from at least one of the storage controller and the service processor to one of the plurality of third mass storage drives appear to the third management controller to be coming from the at least one of the storage controller and the service processor and are used by the third management controller to manage the one of the plurality of third mass storage drives; and
communicate with at least one of the storage controller and the service processor using the virtual management controller such that communications from the third management controller that are related to the management of the one of the plurality of third mass storage drives appear to the at least one of the storage controller and the service processor to be coming from the one of the plurality of third mass storage drives.

15. A method for managing storage subsystem backplanes, comprising:
providing a first backplane including a first management controller that is coupled to a storage controller, a service processor, and a second management controller that is located on a second backplane;
creating a virtual management controller and at least one virtual management engine using the first management controller;
presenting, to the storage controller and the service processor using the virtual management controller, a virtual backplane that appears to the storage controller and the service processor as a single, physical backplane including each of a plurality of first mass storage drives coupled to the first management controller through the first backplane and each of a plurality of second mass storage drives coupled to the second management controller through the second backplane;
communicating with the third management controller using the at least one virtual management engine such that drive management communications from at least one of the storage controller and the service processor to one of the plurality of second mass storage drives appear to the second management controller to be coming from the at least one of the storage controller and the service processor and are used by the second management controller to manage the one of the plurality of second mass storage drives to provide at least one of drive presence monitoring, drive Light Emitting Device (LED) control, and drive Field Replaceable Unit (FRU) information retrieval; and
communicating with at least one of the storage controller and the service processor using the virtual management controller such that communications from the second management controller that are related to the management of the one of the plurality of second mass storage drives appear to the at least one of the storage controller and the service processor to be coming from the one of the plurality of second mass storage drives.

16. The method of claim 15, wherein the drive management communications provided by the at least one virtual management engine and the virtual management controller between the second management controller and the at least one of the storage controller and the service processor allow the at least one of the storage controller and the service processor to control drive management functions of each of the plurality of second mass storage drives separately.

17. The method of claim 16, wherein the virtual backplane appears to the storage controller and the service processor as the single, physical backplane including each of the plurality of first mass storage drives and each of the plurality of second mass storage drives contiguously numbered.

* * * * *